Oct. 18, 1966  A. D. SINDEN  3,279,578
APPARATUS FOR HANDLING BULK MATERIALS
Filed April 27, 1964  3 Sheets-Sheet 1
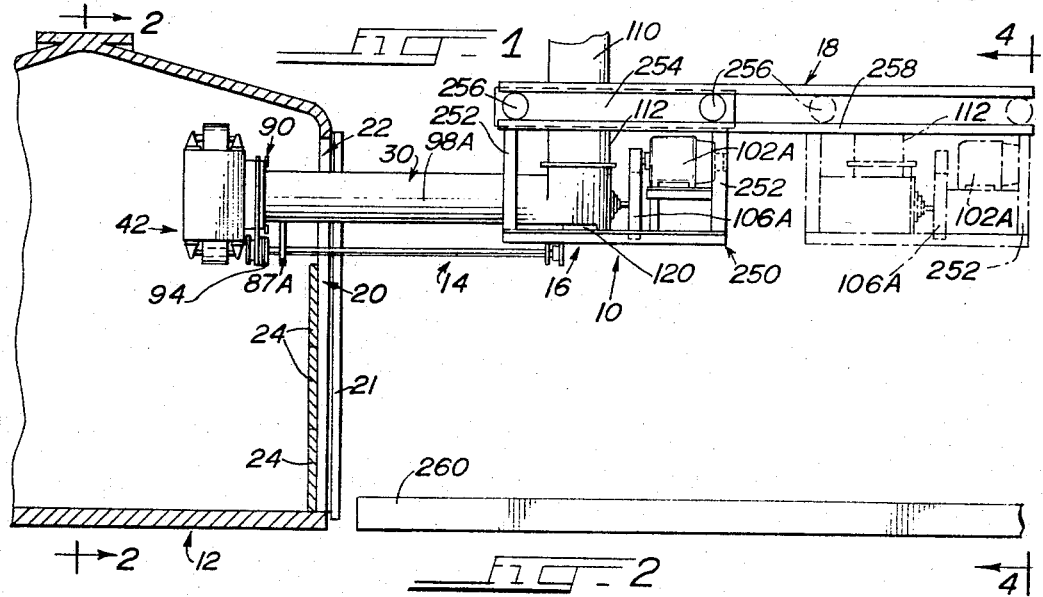
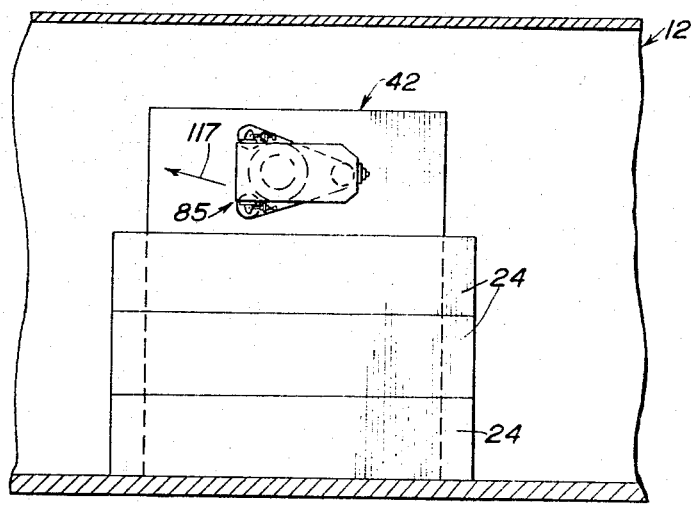
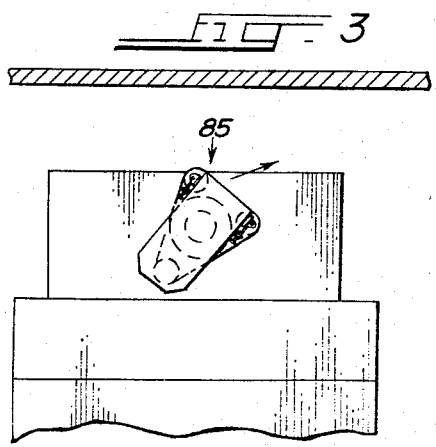
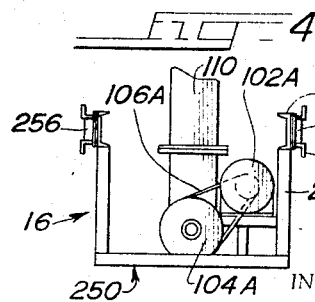
INVENTOR.
ALFRED D. SINDEN
BY
Mann, Brown & McWilliams
ATTYS Oct. 18, 1966  A. D. SINDEN  3,279,578
APPARATUS FOR HANDLING BULK MATERIALS
Filed April 27, 1964  3 Sheets-Sheet 2
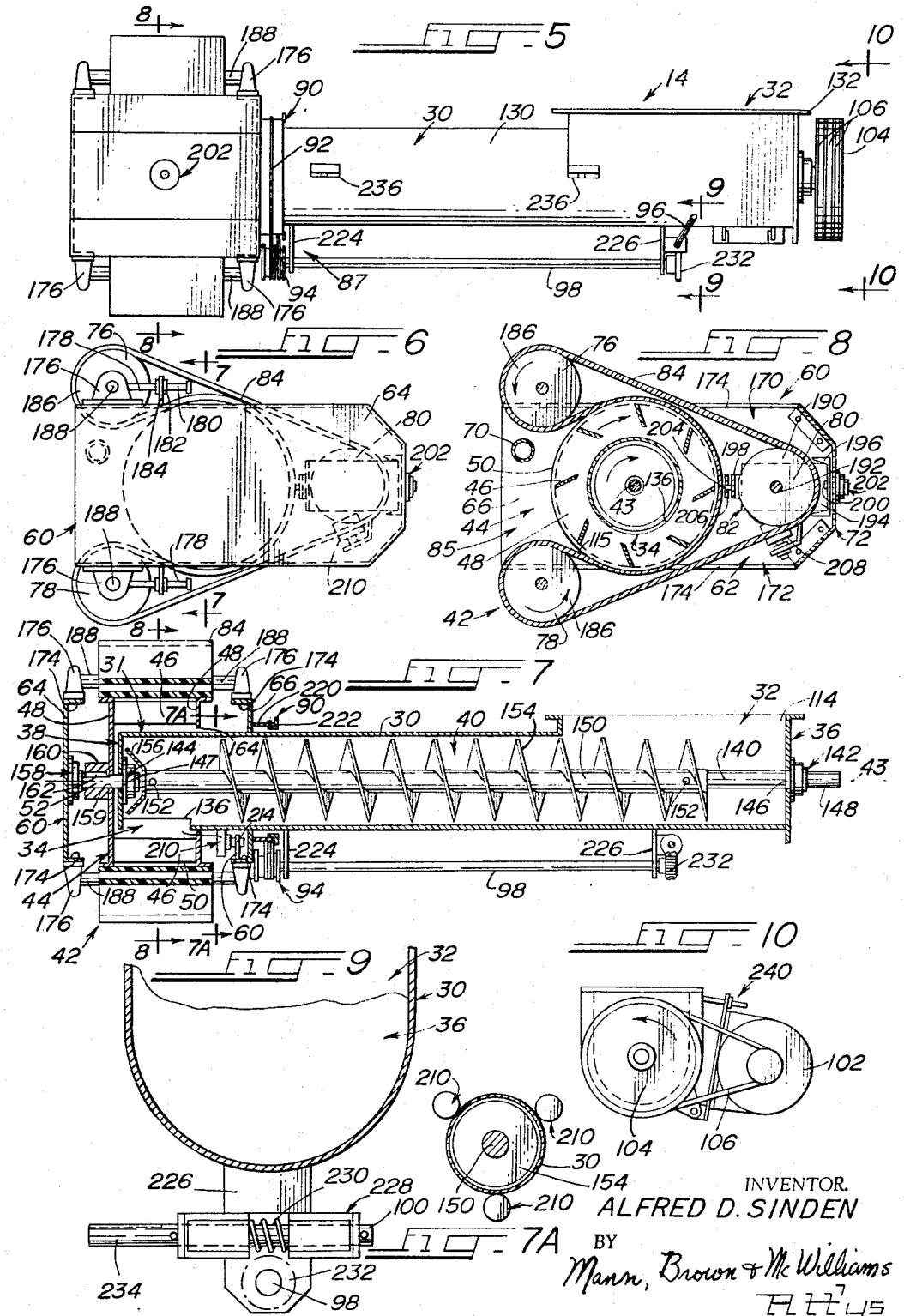
INVENTOR.
ALFRED D. SINDEN
BY
Mann, Brown & McWilliams
ATTYS Oct. 18, 1966       A. D. SINDEN       3,279,578
APPARATUS FOR HANDLING BULK MATERIALS
Filed April 27, 1964                3 Sheets-Sheet 3
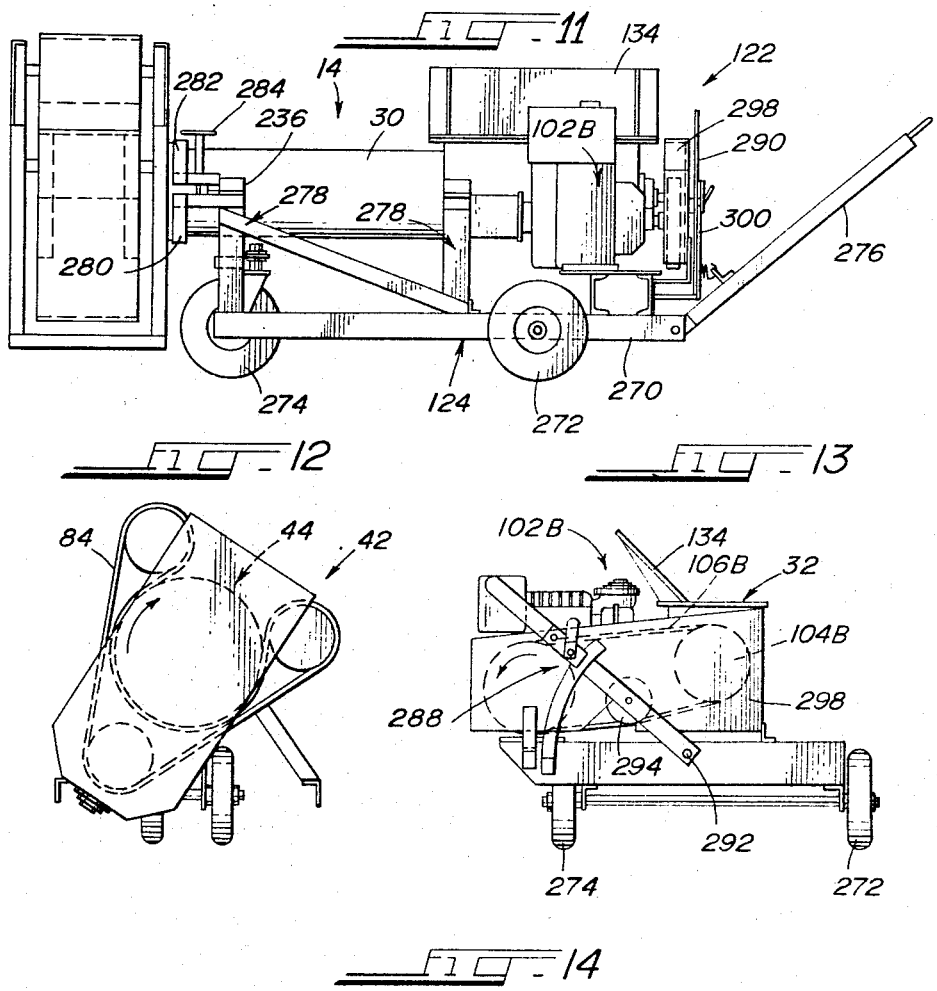
INVENTOR.
ALFRED D. SINDEN
BY
Mann, Brown & McWilliams
Attys

United States Patent Office 3,279,578
Patented Oct. 18, 1966

3,279,578
APPARATUS FOR HANDLING BULK MATERIALS
Alfred D. Sinden, Aurora, Ill., assignor to Stephens-Adamson Mfg. Co., a corporation of Illinois
Filed Apr. 27, 1964, Ser. No. 362,792
4 Claims. (Cl. 198—6)

My invention relates to apparatus for handling bulk materials, and more particularly to apparatus for loading or piling loose materials ranging in size from pulverant materials to coarse materials such as coal.

Loading and piling apparatus of the general types shown in my prior Patents Nos. 1,597,393, 2,467,634, and 2,950,809 require that the bulk materials drop from a rather substantial height directly onto the rapidly moving belt of the thrower apparatus involved to bring the velocity of the bulk materials up to the velocity desired for good throwing trajectories. However, there are specific applications for material handlers of these types in which the small amount of overhead room available precludes any substantial vertical drop of the bulk materials onto the conveyor, thereby requiring that the thrower unit conveyor member itself provide the momentum that ordinarily can be supplied to the bulk materials at least in part by gravity.

An example of such an application is the loading of bulk materials, such as grain, into boxcars. In such instances, under ordinary circumstances one of the units shown in my Patent 2,467,634 may be employed, which involves an apparatus including a thrower unit mounted for swiveling action on the end of a chute that may be swung into the doorway of an appropriately spotted railroad boxcar and swivelled as necessary for throwing the bulk materials into all parts of the car. However, these units require that a large proportion of the upper portion of the car doorway be kept open to permit proper manipulation of the thrower and the necessary free flowing action of the material being handled. Consequently, high capacity units of even the type shown in FIGURES 9–15 of my Patent 2,467,634 will not swing into car doors with doorways of restricted sizes, such as 7½ foot high doorways.

A principal object of my invention is to provide a material handling apparatus of the thrower type that selectively distributes materials in a variety of directions from a central point and yet is small in size in proportion to the material tonnage handled and is arranged to require a minimum of overall overhead room so that it may be applied to material loading or piling situations which have severe overhead room limitations.

Another principal object of the invention is to provide a railroad car loader apparatus of the thrower type which can be inserted into the car through a doorway opening on the order of 30 inches high and yet have the capacity to deliver the material to all parts of the car at a rate on the order of 100 cubic feet per minute.

Yet a further object of the invention is to provide a piler apparatus of the ground supported thrower type that is built sufficiently low to the ground to permit it to be charged from an ordinary dump truck.

Still another important object of the invention is to provide a material handling apparatus arrangement of the thrower type that eliminates the need for any substantial vertical drop of the material being thrown.

Other important objects of the invention are to provide a basic thrower apparatus unit that as a whole may be incorporated into novel type loaders or pilers, to provide a simplified thrower apparatus construction that permits bulk materials being handled to be loaded into the apparatus at one point and conveyed horizontally directly into the thrower apparatus for distribution in a variety of directions about the position of the thrower, and to provide a material handling apparatus that is economical of manufacture, convenient in use, and readily adapted to a wide variety of bulk materials loading and piling situations.

Other objects, uses, and advantages will be obvious or become apparent from a consideration of the following detailed description and the application drawings.

In the drawings:

FIGURE 1 is a side elevational view of a car loader arrangement in accordance with my invention, showing same in position for loading a railroad car, with the car body being shown in vertical section;

FIGURE 2 is an end view of the front or forward end of the car loader apparatus shown in FIGURE 1, taken substantially along line 2—2 of FIGURE 1, showing the thrower apparatus of the car loader positioned to load one end of the car;

FIGURE 3 is a view similar to that of FIGURE 2, but showing the thrower apparatus of the car loader positioned to load the other end of the car;

FIGURE 4 is a view of the rear or back end of the car loader apparatus shown in FIGURE 1 taken along line 4—4 of FIGURE 1;

FIGURE 5 is an enlarged side elevational view of the basic material handling apparatus unit that comprises the car loader shown in FIGURES 1–4;

FIGURE 6 is an end view of the thrower apparatus end of the apparatus unit shown in FIGURE 5, taken from the left hand side of FIGURE 5;

FIGURE 7 is a diagrammatic cross-sectional view substantially along line 7—7 of FIGURE 6, with the screw conveyor being shown in elevation;

FIGURE 7A is a fragmental cross-sectional view substantially along line 7A—7A of FIGURE 7;

FIGURE 8 is a diagrammatic cross-sectional view taken substantially along line 8—8 of FIGURES 5 and 7;

FIGURE 9 is a fragmental elevational view taken substantially along line 9—9 of FIGURE 5, but on an enlarged scale;

FIGURE 10 is an end view taken along line 10—10 of FIGURE 5;

FIGURE 11 is a side elevational view of a piler arranged in accordance with my invention and including the apparatus unit shown in FIGURE 5;

FIGURE 12 is a front end view of the piler shown in FIGURE 11, taken from the left hand end of the apparatus;

FIGURE 13 is a right hand or rear end view of the piler shown in FIGURE 11; and

FIGURE 14 is a small scale diagrammatic elevational view illustrating the manner in which the piler of FIGURES 11–13 operates.

However, it is to be distinctly understood that the specific drawing illustrations provided are supplied primarily to comply with the requirements of 35 U.S.C. 112, and that the invention may take other specific embodiments. Consequently, the appended claims are to be construed as broadly as the relevant prior art will permit.

General Description

Reference numeral 10 of FIGURE 1 generally indicates a car loader apparatus arranged in accordance with my invention to load bulk materials, such as grain, from a large storage bin or hopper into a railroad boxcar 12.

The apparatus 10 comprises a basic bulk materials handling apparatus unit 14 having the specific features shown in FIGURES 5–9 mounted on a trolley 16 riding on a suitable trackway 18, with suitable means being provided for moving the trolley 16 from the retracted position shown in dashed lines in FIGURE 1 to the full line position wherein the materials handling apparatus unit 14 extends into the boxcar through its doorway 20 (normally closed by sliding door 21), and in particular, through the relatively small opening 22 that remains at the top of the doorway 20 after securing grain boards 24 across the lower portion of the doorway in the usual manner.

As indicated in FIGURES 5–7, the materials handling apparatus unit 14 comprises an elongated, generally rectilinear casing 30 formed to define a materials receiving inlet or hopper portion 32 at one end thereof and a downwardly opening materials discharge or outlet 34 at the other end of the casing.

The casing is also formed to define end wall structures 36 and 38 in which is journalled a screw conveyor 40 that extends between the hopper portion 32 and the outlet 34 as indicated in FIGURE 7.

The unit 14 has journalled over the outlet 34 of casing 30 the thrower apparatus 42, which in accordance with this invention is mounted for rotational movement about the axis of rotation 43 of the screw conveyor 40. The thrower apparatus 42 comprises an open periphery drum 44 journalled for rotation about the axis of rotation of the screw member 40, and including a plurality of impeller blades 46 extending between the spaced discs 48 that form the ends of the drum 44. As indicated in FIGURE 8, the periphery 50 of the drum is open between adjacent impeller blades 46.

In accordance with this invention, the drum 44 is mounted on a shaft extension 52 that is keyed with respect to conveyor 40, and drum 44 is keyed with respect to the shaft extension 52 for rotational movement therewith.

Thrower apparatus 42 also comprises a frame 60 that is also mounted for rotational or pivotal movement about the rotational axis of conveyor member 40, and in the embodiment illustrated, the frame 60 comprises a U-shaped frame structure 62 defining side walls 64 and 66 that are received on either side of the drum 44, with the side wall 64 being journalled on the shaft extension 52 and the side wall 66 being journalled on the casing 30. The side walls 64 and 66 are joined together by a tubular brace 70 and an end wall structure 72 (see FIGURE 8).

The frame 60 has rotatably mounted on one side of the axis of rotation of the screw conveyor 40 and the drum 44 a pair of idler pulleys 76 and 78, and an idler pulley 80 is rotatably mounted on the other side of said axis in a frame structure 82 that is carried by the frame 60 for swivelling movement about an axis that is perpendicular to the axis 43. Endless conveyor member or belt 84 is trained over the pulleys 76, 78 and 80, substantially in the manner indicated in FIGURE 8, with the portion of the endless member extending between the pulleys 76 and 78 being applied against the periphery 50 of drum 44 to define a thrower discharge port 85.

Further in accordance with this invention, unit 14 includes an appropriate arrangement or device 87 for selectively positioning or adjusting the thrower apparatus 42 about the axis of rotation of the conveyor 40 for changing the trajectory of the thrower, and in the form illustrated, this device 87 comprises a drum or circular flange 90 that is fixed with respect to frame 60 and has received thereover a looped cable 92 which is also cross-looped several times over a drum 94 that may be actuated by appropriate handle 96 through the shafting 98 and 100 (and appropriate interconnecting gearing) substantially in the manner indicated in FIGURES 5, 7 and 9. Cable 92 is, of course, applied to drums 90 and 94 sufficiently tight that adequate traction is established to insure that movement of drum 94 will cause a corresponding movement of drum 90.

The screw conveyor 40 is driven in any appropriate manner, as by motor 102 driving pulley 104 through appropriate pulley belts 106 (see FIGURES 5 and 10), or in the similar manner shown in FIGURES 4 and 13, respectively.

When the apparatus unit 14 is applied to the car loader 10, appropriate motor 102A is employed to drive the screw conveyor 40 through pulley structure 104A and pulley belt 106A. The hopper portion 32 of casing 30 is connected with the storage bin outlet by a flexible chute 110 that may include a suitable adapter structure 112 appropriately connected with the hopper inlet 114 of loader 10 in any suitable manner.

In operation, the car loader 10, after the car 12 has been appropriately spotted in front of the trackway 18, is moved from the dashed line retracted position of FIGURE 1 to the extended full line position to dispose the loader apparatus 42 within the car through the car door opening, and as indicated in FIGURE 1, grain boards 24 may be applied across the doorway 20 to the elevated position indicated in FIGURE 1.

The thrower apparatus 42 may then, by using adjustment device 87 or its equivalent, be positioned with respect to the casing 30 in substantially the manner indicated in FIGURE 2 to fill one end of the car, after which the motor 102A is actuated to start the required movement of screw conveyor 40, which also drives the endless conveyor 84 through the drum 44. Bulk materials from the adjacent bin are then discharged into the casing hopper portion 32, and are fed by the screw conveyor 40 to the outlet 34 of the casing, whereupon the materials drop a short distance between the impeller blades 46 onto the surface 115 of the endless member 84. It will be noted that the casing outlet 34 is disposed within the drum 44 and directly over the endless member surface 115. The bulk materials after dropping to the belt surface 115 travel circumferentially with the belt to the point where the belt leaves the drum periphery to wrap on pulley 78. At this point, the bulk materials continue in a straight line due to the momentum achieved, and they proceed in the direction of the arrow 117 indicated in FIGURE 2 towards the far end of the car to which the bulk materials discharge port or opening 85 of the thrower apparatus 42 is directed.

In the specific car loader embodiment shown in FIGURES 1–4, the apparatus or device 87A for pivoting the thrower with respect to the casing 30 may take the form of a shaft 98A journalled at the side of the casing, rather than its bottom as in the embodiment shown in FIGURES 1 and 5. In either embodiment the shaft 98A is driven by appropriate motor 120 that is suitably controlled by the operator. Thus, changing of the position of the thrower 42 with respect to casing 30 is achieved by operating motor 120, which rotates the thrower apparatus 42 about the axis of conveyor 40 through drums 90 and 94 that are best shown in FIGURE 5. This provides for changing the position of the thrower 42 from that shown in FIGURE 2 to that shown in FIGURE 3 for the purpose of loading the other end of the car.

FIGURES 11–14 illustrate the materials handling apparatus unit 14 embodied in a piler arrangement 122, which involves securing the unit 14 on a cart structure 124 by appropriately fixing the casing 30 to the cart. This provides a piler unit 122 in which the thrower apparatus 42 may be positioned substantially as indicated in FIGURES 12 and 14 for throwing bulk materials in an appropriate trajectory to a piling point. The thrower apparatus 42 may be turned with respect to casing 30 in the piler 122 either by hand or by adjustment device 87 (which is omitted in the showing of FIGURES 11–14) to change the trajectory of the piler. The piler 122 is thus built sufficiently close to the ground to permit a conventional tilting body dump vehicle 126 to dump its load directly into the casing hopper portion 32.

When the piler 122 is to be operated, its motor 102B is operated to drive the screw conveyor 40 through pulley 104B and pulley belts 106B, which achieves the necessary rotational movement of drum 44 and endless conveyor member 84.

*Specific description*

The casing 30 of unit 14 may be formed from any suitable material such as 12 gauge sheet metal, and comprises a tubular body 130 that is substantially circular in transverse cross-sectional configuration between end wall structure 38 and the hopper portion 32. The body 130 in the area of the hopper portion 32 is substantially U-shaped in cross-sectional transverse configuration, as indicated in FIGURE 9. The hopper portion 32 may be provided with an appropriate horizontally disposed top flange 132 for connection to adapter structure 112 in the car loader embodiment of FIGURE 1, or for connection to the deflector 134 indicated in the piler arrangement of FIGURES 11–14.

The outlet 34 of the casing 30 is defined by the downwardly facing opening 136 of the casing tubular portion 130, and as indicated in FIGURE 7, the opening 136 is positioned closely adjacent the end wall 38 of the casing.

The screw conveyor 40 comprises an elongate shaft 140 that is journalled in the casing 30 for rotational movement about the central axis of casing portion 130 (as well as axis 43) by being mounted in appropriate ball bearing units 142 and 144 which are secured in any appropriate manner to the respective end walls 36 and 38 about the respective perforations 146 and 147 that receive the respective shaft ends.

The shaft 140 adjacent wall 36 extends outwardly of the wall 36 as at 148 to receive the pulley 104 which is keyed to the shaft 140 in any appropriate manner.

The screw conveyor 40 further comprises a tubular member 150 received over shaft 140 and keyed thereto as by appropriate pins 152. Affixed to the tubular member 150 is an appropriate screw structure 154 that may be of any appropriate type which is adapted to feed bulk materials from hopper portion 32 to outlet 34 when the screw conveyor 40 is actuated. Tubular member 150 also has affixed thereto adjacent end wall 38 a dished baffle member 156 that shields the bearing unit 144.

The shaft 140 includes a projecting end portion 52 that extends outwardly of the end wall 38 and at its extreme end has mounted thereon an appropriate ball bearing unit 158 which is in turn affixed to end wall 64 of the thrower apparatus frame 60.

Parenthetically, it may be mentioned that the ball bearing units 142, 144 and 158 may be, for example, of the general type shown in Glavan et al. Patent 2,952,898, with the housing of the bearing unit being secured to the respective end walls 36, 38 and 64, and the inner races of the respective ball bearing units being keyed to the shaft 140 in any convenient manner.

The drum outer disc 48 of thrower apparatus 42 is aperatured as at 159 to reecive shaft end portion 52, and includes hub 160 that is affixed to the outer drum disc 48 and which is keyed to shaft extension 52 by appropriate key 162 received in the aligned slots of hub member 160 and the shaft extension 52 that are indicated in FIGURE 7. The inner drum disc 48 is formed with an enlarged central opening 164 proportioned to substantially complement the external diameter of casing 30 so that the end portion 31 of casing 30 may be disposed within the drum 44.

As indicated in FIGURE 8, the impeller blades 46 of the drum are inclined at an angle with respect to radial planes passing through the portions of the drum periphery at which the respective blades 46 are located, and preferably the angulation is on the order of 20 degrees, with the inner ends of the respective blades being angled in the direction of rotation of the drum 44. Blades 46 provide a moving stream of air which aids in the movement of the bulk materials.

The frame 60, and in particular its U-shaped structure 62 defines open sides 170 and 174 (see FIGURE 8) respectively which may be termed the top and bottom sides of the frame 60. The end walls 64 and 66 are provided with inwardly directed flanges 174 at the top and bottom sides of the frame 60, on which appropriate pillow block ball bearing units 176 are mounted for journalling the pulleys 76 and 78. The ball bearing units 176 may be, for example, of the general type disclosed in said Glavan patent, and may be provided with an appropriate adjustment screw arrangement generally indicated at 178 for the purpose of appropriately tensioning the conveyor member or belt 84, and for this purpose, the housings of the ball bearing units 176 are bolted to the flanges 174, with the bolts being applied through elongated slots (not shown) that extend longitudinally of the flanges 174; the units 176 may be adjusted by loosening the bolts and then operating the adjusting devices 178, which comprise a screw member 180 received in a nut member 182 fixed in an upstanding bracket plate 184 that is in turn affixed to the respective flanges 174.

The pulleys 76 and 78 each comprise roller members 186 provided with axially extending shaft portions 188 that are journalled in the usual manner in the respective bearing units 176.

The pulley 80 comprises a roller 190 affixed to a shaft 192 that has its ends journalled in quadrilateral frame structure 82, made up of side plates 194 (only one of which is shown) affixed to the respective ends of a channel member 196 and an end plate 198, with the channel member 196 and end plate 198 each carry pins 200 and 204 that pivotally mount the frame 82 to the frame 60 for pivotal movement about an axis that extends perpendicular to the axis of rotation of the pulley 80 as well as axis 43.

In the embodiment illustrated, the pin 200 of the channel member 196 is journalled in a ball bearing unit 202 while the pin 204 is received in a plate 206 that is fixed between the frame end walls 64 and 66. Unit 202 may be essentially the same as units 142 and 144.

A pair of guide rollers 208 and 210 engage opposite sides of the endless member 84 for self training purposes.

As indicated in FIGURES 7 and 7A, the thrower apparatus end wall 66 has secured thereto three rollers 210 which in effect journal that side of the frame 60 on casing 30 for rotational or pivotal movement about casing 30 and the axis of rotation of shaft 140 (axis 43). The rollers 210 may be of any suitable type, and in the form shown comprise an appropriate roller unit 212 mounted in an appropriate bracket structure 214 (only one of which is shown) affixed in any suitable manner to the end wall 66.

The drum 90 comprises an annular member 220 affixed to the exterior surface of the thrower apparatus frame end wall 66, which in turn has fixed to its outwardly extending edge an annular ridge forming member 222. The cable 92 is looped over the annular member 220 and then crossed over on itself for double looping over the drum 94.

The shaft 98 is journalled in any appropriate manner in a pair of depending bracket plates 224 and 226, the latter bracket plate also fixedly carrying appropriate bracket structure 228 which journals worm shaft 100 provided with an appropriate worm gear 230 which engages with worm wheel 232 that is keyed to the shaft 98. One end 234 of the worm shaft 100 may be squared or otherwise formed to receive actuating handle 96.

In the specific unit 14 that is shown in FIGURES 5–9, the casing 30 is also provided with appropriate angle brackets 236 (on both sides thereof, although only one side is shown) for mounting same on a suitable supporting structure, such as the cart of the piler of FIGURES 11–14. However, these devices are omitted in the showing of FIGURE 1 and it is assumed that unit 14 is affixed to the trolley 10 in any convenient manner.

In the showing of FIGURE 10, the motor 102 for actuating screw conveyor 40 is shown affixed to the casing 30 by an appropriate mounting plate structure generally indicated at 240. However, this is omitted in the specific embodiments of FIGURES 1–4 and 11–14 in favor of the arrangements shown in those figures.

In the car loader arrangement shown in FIGURES 1–4, the trolley 16 generally comprises a platform 250 provided with upstanding end posts 252 affixed to channel members 254 (see FIGURE 4) which extend longitudinally of the trackway 18 and have rotatably secured thereto the rollers 256 that ride on rails 258 which define the trackway 18.

The casing 30 of unit 14 is secured to the platform 250 in any appropriate manner, with its end portion 31 projecting cantilever style in the direction of the railroad track on which the car 12 is to ride. The track (which is not shown) is usually present at the base of conventional loading dock 260 above which trolley 16 operates.

As already indicated, in the car loader arrangement of FIGURE 1, the device 87A for rotating or pivoting the loader apparatus 42 about casing may be positioned to one side of the casing, and this amounts to applying the mounting brackets for shaft 98A at 90 degrees above the position shown in FIGURE 5. Suitable couplings and gear reducers may be applied between motor 120 and the shaft 98A as may seem necessary or desirable, and motor 120 may be controlled by the operator in any suitable manner.

In the piler shown in FIGURES 11–14, the cart 124 comprises a wheeled frame 270 provided with appropriate supporting wheels 272 and 274 and a suitable draw bar arrangement 276 for moving the piler 122 from place to place.

The cart 124 includes upstanding support structures 278 on either side thereof to which the angle brackets 236 are secured in any suitable manner. The forward support structures 278 include a cradle member 280 in which the casing rests and an upper clamping member 282 which is moved into clamping engagement with the casing 30 by appropriate screw members 284 that are disposed on each forward support structure 278 (although only one is shown). Cradle member and clamping member engage drum 90 in the embodiment of FIGURES 11–14.

The piler 122 may include a suitable belt tensioning arrangement 288 for pulley belt 106B which is only diagrammatically illustrated, but includes a lever 290 pivoted to the wheeled frame as at 292 and rotatably mounting belt engaging roller 294. As this device forms no part of the present invention, no further description is necessary, as any suitable belt tensioning device, if deemed necessary, will suffice.

*Distinguishing characteristics of the invention*

It will therefore be seen that I have provided a unique bulk material handling apparatus unit of compact and integrated characteristics that is small in proportion to the materials tonnage capable of being handled, and requires a minimum of overall head room.

When this unit is embodied in a car loader arrangement, such as that shown in FIGURES 1–4, the unit can enter a car through an opening 30 inches high at the top of a car doorway and yet deliver material to all parts of the car at a rate on the order of 100 cubic feet per minute.

Since in the car loader arrangement 14 the material handling unit is horizontally disposed and moves in a horizontal plane directly into and out of the car door, the car door height no longer is a critical factor.

In piler arrangements of the type indicated by unit 122, the basic materials handling unit 14 permits the piler to be built so close to the ground that ordinary dumping vehicles may be employed to supply the piler with the materials to be thrown.

One of the factors that simplifies the arrangement of the basic unit 14 is the elimination of the separate driving mechanism for the thrower apparatus. Thus, in accordance with my invention, the thrower apparatus is operated by keying the drum that receives the material to be thrown with the screw conveyor that feeds the bulk materials to the drum.

It will also be appreciated that the manner of mounting the thrower apparatus for rotatable movement on the outwardly projecting end of the apparatus casing achieves substantial simplification of parts while providing a complete adjustability of the entire thrower unit with respect to the screw conveyor. As the thrower apparatus 42 is mounted for movement 360 degrees about the axis of rotation of the screw conveyor, the trajectory of the thrower apparatus may be changed to any desired point in the vertical plane in which the thrower apparatus moves.

Another important factor is that the momentum supplied to the material being thrown is achieved through the cooperation of the drum impeller blades and the rapidly moving thrower endless member or belt.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. A bulk materials handling apparatus comprising:
an elongate casing that is substantially rectilinear longitudinally thereof,
means for supporting said casing in a substantially horizontal position with one end thereof projecting outwardly of said supporting means,
an end wall structure at each end of said casing closing the respective ends thereof,
said casing one end being formed to define a cylindrical external configuration comprising a casing cylindrical portion,
said casing being further formed to define a downwardly opening outlet in said cylindrical portion thereof adjacent the end wall structure at said one end thereof and a hopper portion positioned between said outlet and the other end wall structure,
a shaft positioned in said casing in substantial alignment with the longitudinal axis of said casing cylindrical portion and journalled in said end wall structures for rotation about its longitudinal axis,
a screw conveyor member positioned in said casing and keyed to said shaft for rotation therewith,
said screw conveyor member extending substantially between said casing hopper portion and said outlet,
said shaft projecting outwardly of the wall structure at said one end of said casing to define a projecting shaft portion disposed outwardly of said casing one end,
and a thrower apparatus journalled on said shaft portion and said casing cylindrical portion at said one end of said casing for pivotal movement about said axis of said casing cylindrical portion,
said thrower apparatus comprising:
a frame positioned over said outlet and comprising a first side wall journalled on said casing cylindrical portion and a second opposing side wall journalled on said shaft portion,
said side walls of said frame being connected together to define said frame and being journalled for pivotal movement about said shaft axis,
an open periphery impeller drum disposed between said frame side walls and being received over said casing cylindrical portion in alignment with said outlet,
said drum being supported by and keyed to said shaft portion for rotation therewith,
pulley means journalled between said frame side walls for training an endless conveyor member over the portion of the periphery of said drum,
an endless conveyor member trained over said pulley means and against said portion of said drum periphery,
said pulley means comprising:
a pair of pulleys journalled for rotation between said frame side walls on one side of said shaft axis,
and at least one pulley journalled for rotation between said frame side walls on the other side of said shaft axis, said endless conveyor member being looped over said pulleys with the portion of said endless member disposed between said pair of pulleys being positioned over said drum between said drum and said one pulley to define a thrower discharge outlet between said pair of pulleys, means for driving said shaft to rotate said screw member and said drum, and means for pivoting said thrower frame with respect to said casing to change the trajectory of said thrower apparatus.

2. The apparatus set forth in claim 1 wherein:
said supporting means for said casing comprises:
a trolley,
said trolley being mounted on a trackway,
and including means for moving said trolley longitudinally of said trackway to move said casing between an extended operative position and a retracted inoperative position,
and including a flexible conduit connecting said casing hopper portion with a source of bulk materials.

3. The apparatus set forth in claim 2 in combination with:
a railroad track positioned below said trackway and extending crosswise of the plane of movement of said trolley with respect to said trackway,
said casing being disposed at a level above said track to position said casing at the level of the upper portion of railroad boxcar doors.

4. The apparatus set forth in claim 1 wherein:
said supporting means comprises a wheeled cart structure,
said cart structure being proportioned to dispose said casing hopper portion at an elevation to permit ground supported dumping vehicles to discharge bulk materials into said hopper portion thereof when said cart structure rests on the ground.

References Cited by the Examiner
UNITED STATES PATENTS

| | | | |
|---|---|---|---|
| 614,891 | 11/1898 | Reynolds | 198—6 |
| 677,241 | 6/1901 | Kurtz | 198—6 |
| 799,287 | 9/1905 | Yackee | 198—6 |
| 1,960,859 | 5/1934 | Wright | 198—128 |
| 2,779,455 | 1/1957 | Sinclair | 198—128 |

EVON C. BLUNK, *Primary Examiner.*

R. J. HICKEY, *Assistant Examiner.*